United States Patent
Murakami et al.

(10) Patent No.: US 8,060,537 B2
(45) Date of Patent: Nov. 15, 2011

(54) STORAGE PORTION MANAGEMENT DEVICE, IMAGE PROCESSOR, METHOD FOR CONTROLLING THE SAME AND COMPUTER PROGRAM PRODUCT

(75) Inventors: Masakazu Murakami, Itami (JP); Hironobu Nakata, Itami (JP); Kazumi Sawayanagi, Itami (JP); Minako Kobayashi, Ikeda (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 708 days.

(21) Appl. No.: 11/023,830

(22) Filed: Dec. 29, 2004

(65) Prior Publication Data

US 2006/0095399 A1 May 4, 2006

(30) Foreign Application Priority Data

Oct. 21, 2004 (JP) ................................. 2004-307174

(51) Int. Cl.
*G06F 17/30* (2006.01)

(52) U.S. Cl. ...................................................... 707/803

(58) Field of Classification Search ................... 382/10, 382/107, 307; 271/207; 358/474, 296; 707/10, 707/102, 200, 201, 202, 203, 204, 205, 35; 709/206; 714/45
See application file for complete search history.

(56) References Cited

U.S. PATENT DOCUMENTS

| | | | |
|---|---|---|---|
| 5,008,853 A * | 4/1991 | Bly et al. ........................ 715/751 |
| 5,414,494 A | 5/1995 | Aikens et al. |
| 6,191,869 B1 | 2/2001 | Miura |
| 6,249,356 B1 | 6/2001 | Yoshikawa et al. |
| 6,307,643 B1 | 10/2001 | Okada et al. |
| 6,453,361 B1 * | 9/2002 | Morris ........................... 709/250 |
| 6,745,334 B1 | 6/2004 | Ikegami |
| 7,080,124 B1 * | 7/2006 | Shankar ......................... 709/206 |
| 7,174,031 B2 * | 2/2007 | Rhoads et al. ................. 382/107 |
| 2001/0015828 A1 * | 8/2001 | Miyamoto et al. ............ 358/474 |
| 2003/0222396 A1 * | 12/2003 | Kurahashi et al. ............ 271/207 |
| 2005/0213790 A1 * | 9/2005 | Rhoads et al. ................. 382/100 |

FOREIGN PATENT DOCUMENTS

| | | |
|---|---|---|
| JP | 3-157742 | 7/1991 |
| JP | 2002-361970 A | 12/2002 |
| JP | 2003-044413 A | 2/2003 |
| JP | 2003-099547 | 4/2003 |
| JP | 2003-140958 | 5/2003 |
| JP | 2003-150544 | 5/2003 |

(Continued)

OTHER PUBLICATIONS

Notification of Reasons for Refusal in JP 2004-307174 dated Jan. 22, 2008, and translation thereof.

(Continued)

*Primary Examiner* — Diane Mizrahi

(74) *Attorney, Agent, or Firm* — Buchanan Ingersoll & Rooney PC

(57) ABSTRACT

An image forming device includes a box for each user for storing a file, a table management portion for storing a file change in the box together with a time when the change happened as change history information, an inbox change detection portion for detecting a file change in the box of the user when the user logs in that happened before the user logs in this time in accordance with the change history information of the box and a screen display process portion for displaying a result of the detection.

24 Claims, 18 Drawing Sheets

FOREIGN PATENT DOCUMENTS

JP    2003-241928    8/2003

OTHER PUBLICATIONS

UP-UX Software System Management Reference, Japan, NEC Corporation, Jun. 1993, 4th Edition, p. 88.

Notification of Reason(s) for Refusal in JP 2004-307174 dated Aug. 19, 2008, with English Translation thereof.

Japanese Official Communication dated Dec. 22, 2009 for corresponding Japanese Patent Application No. 2008-075123.

* cited by examiner

| USER NAME | PASSWORD | LATEST LOG-IN DATE | OPERATING HISTORY | OWNED BOX ID |
|---|---|---|---|---|
| MURAKAMI | 1234ABC!(% | 2004/10/01 09:30:00 | COPY:2004/10/01 09:35:10<br>BOX:2004/10/01 09:40:20 | B01,B04,B05 |
| WAKUI | KLKL9d#$ | 2004/10/02 11:30:00 | SCAN:2004/10/02 11:37:10<br>COPY:2004/10/02 11:51:40 | B02,B04,B06 |
| SAKURAI | DeePd3sr3sea | 2004/10/01 13:25:30 | COPY:2004/10/01 13:27:50<br>BOX:2004/10/01 13:33:35 | B03, B04 |
| ... | ... | ... | ... | ... |

FIG. 7
TB2
| BOX ID | BOX NAME | OWNER | FILE MANAGEMENT INFORMATION |
|---|---|---|---|
| B01 | FOR STORING DATA FOR SENDING TO CUSTOMERS | MURAKAMI |  ~7F1 (7F) |
| B02 | PERSONAL BOX | WAKUI |  ~7F2 (7F) |
| B03 | FOR STORING SCAN DATA | SAKURAI |  ~7F3 (7F) |
| B04 | FOR STORING DATA OF GROUP A | GROUP A |  ~7F4 (7F) |
| B05 | FOR STORING INTERNAL DATA | MURAKAMI |  ~7F5 (7F) |
| B06 | BOX STORING PUBLIC DATA | WAKUI |  ~7F6 (7F) |
| ⋮ | ⋮ | ⋮ | ⋮ |

BOX Document ID = 001
Document Name = program_1.pdf
Create Time = 2004/09/28 10:20:30   } DTJ
Edit Time = 2004/09/30 12:55:00
Check Flag = 1

BOX Document ID = 002
Document Name = report_1.pdf
Create Time = 2004/09/28 12:15:30   } DTJ
Edit Time = 2004/10/03 11:05:15
Check Flag = 0

BOX Document ID = 003
Document Name = catalog_X.pdf
Create Time = 2004/09/30 14:50:30   } DTJ
Delete Time = 2004/10/03 10:17:50
Check Flag = 0

BOX Document ID = 004
Document Name = list_Z.pdf
Create Time = 2004/10/03 11:22:33   } DTJ
Check Flag = 0

| FUNCTION NAME | DATE AND TIME OF ADDITION |
|---|---|
| SMB TRANSMISSION | 2004/10/02 08:20:20 |
| BROADCAST TRANSMISSION | 2004/10/03 11:30:25 |
| BOOKLET FINISH | 2004/10/03 14:15:00 |
| ⋮ | ⋮ |

FIG. 10

PLEASE ENTER YOUR USER NAME AND PASSWORD.

USER NAME:

PASSWORD:

ENTER

HG1

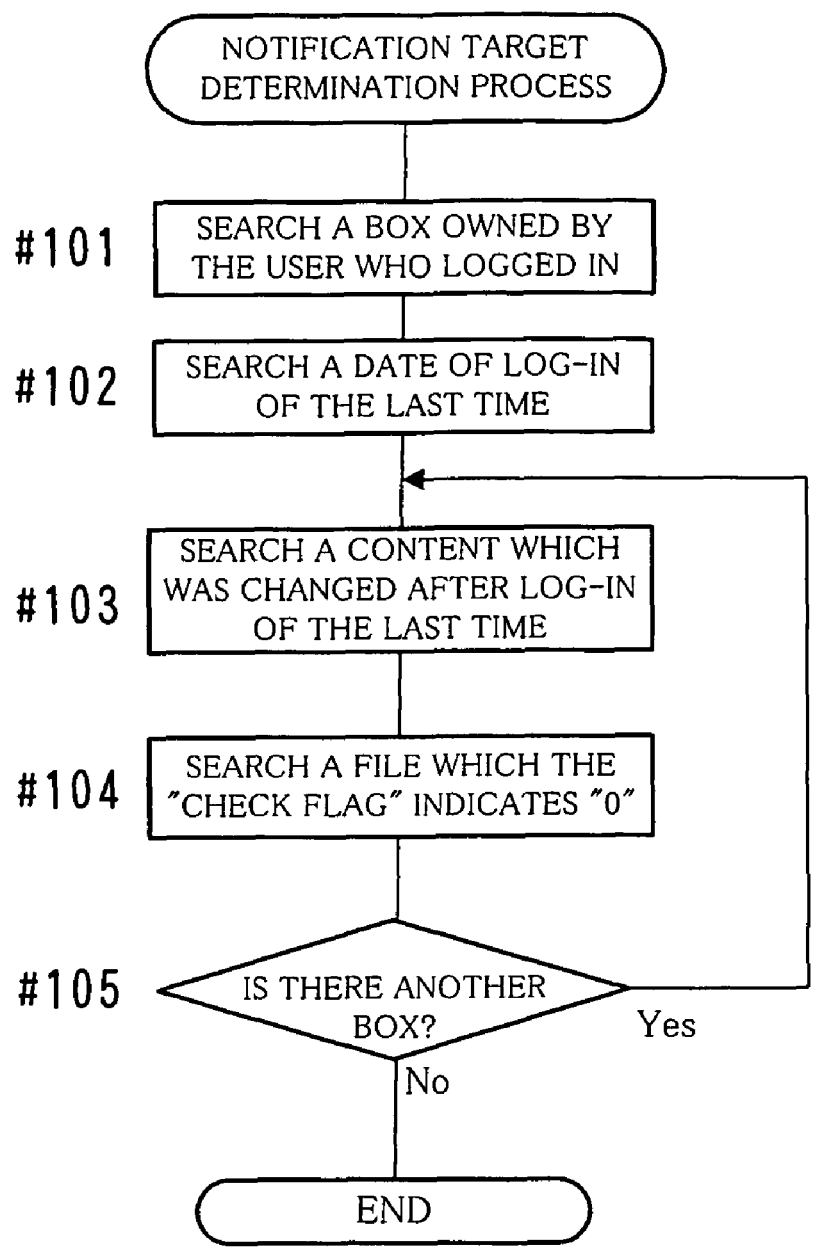

STORAGE PORTION MANAGEMENT DEVICE, IMAGE PROCESSOR, METHOD FOR CONTROLLING THE SAME AND COMPUTER PROGRAM PRODUCT

This application is based on Japanese Patent Application No. 2004-307174 filed on Oct. 21, 2004, the contents of which are hereby incorporated by reference.

BACKGROUND OF THE INVENTION

1. Field of the Invention

The present invention relates to an image processor such as an MFP and a method for controlling the image processor.

2. Description of the Prior Art

An image forming device having functions of a copier, a network printer, a scanner and a fax is widely used. This type of the image forming device is called a multifunction device or an MFP (Multi Function Peripherals).

Recently, in addition, along with improvement of a CPU performance, a large capacity of storage devices, and easy establishment of a network, a function of a document server is added to the image forming device such as the MFP, which has become commonplace and is increasingly installed in offices. This function provides each user with a storage area for each user in a hard disk drive so that each user can store data such as an image file in his or her box. This storage area is called a "box" or a "personal box".

The user can permit other person to use his box instead of using it by himself. If the user is authorized to use other person's box, the user can do it. It is also possible that plural user of a group share one box.

In addition, there are some methods proposed for using the box conveniently. Japanese unexamined patent publication No. 2002-361970 discloses a method in which an entered image data are stored in a hard disk drive after being added registration ID information including a user code. Then, when a search ID number is entered, the user code included in the search ID number is verified with the user code included in the registration ID information, and a name of the image data is displayed in accordance with a result of the verification. By this method, the user can know easily which image data in a box is his or hers even if many people share one box.

Another method is described in Japanese unexamined patent publication No. 2003-44413, in which a user is inquired about how to handle an attached file if it is attached to electronic mail.

As described above, a user can give right to use a box that is assigned to the user to other user. Thus, it becomes easy to exchange data or share data among users.

However, according to the conventional method as described in the above-mentioned documents, it is difficult for a user to manage data stored in his or her box. It is because that other users operation may add new data in his or her box, may update data stored in his or her box, or erase the data, when the user cannot know correctly the situation of data in the box unless the other user reports him or her about the operation the other user did.

Therefore, if there is a change of data in the box due to an operation of other user such as exchange of data or update of data, it can happen that the owner does not know the change and later knows the change of data. In addition, when a new function is added, there can be users who are not aware of the addition so that the new function cannot be used sufficiently.

SUMMARY OF THE INVENTION

An object of the present invention is to realize management of a box that is shared by plural users in a more reliable manner than the conventional method.

A storage portion management device according to an aspect of the present invention is a storage portion management device for managing a storage portion including a storage area assigned to each user for storing a file. The storage portion management device includes a change history information recording portion for recording a file change in the storage area together with a time when the change happened as a change history information, and a change notifying portion for notifying the user when the user logs in about the change that happened in the storage area of the user before the user logs in this time in accordance with the change history information of the storage area.

An image processor according to another aspect of the present invention is an image processor for performing a process concerning input or output of an image. The image processor comprises a function extension history information recording portion for recording a newly extended function in the image processor together with a time of the extension as function extension history information and a notifying portion for notifying the user when the user logs in the image processor about the function that was extended during the period from the previous log-in to the present log-in of the user in accordance with the function extension history information.

BRIEF DESCRIPTION OF THE DRAWINGS

FIG. 6 shows an example of a user management table.

FIG. 7 shows an example of a box management table.

FIG. 8 shows an example of file management information.

FIG. 9 shows an example of an additional function table.

FIG. 10 shows an example of a log-in screen.

FIG. 12 is a flowchart showing an example of a flow of a notification target determination process.

DESCRIPTION OF THE PREFERRED EMBODIMENTS

Hereinafter, the present invention will be explained more in detail with reference to embodiments and drawings.

First Embodiment

Figure 1:
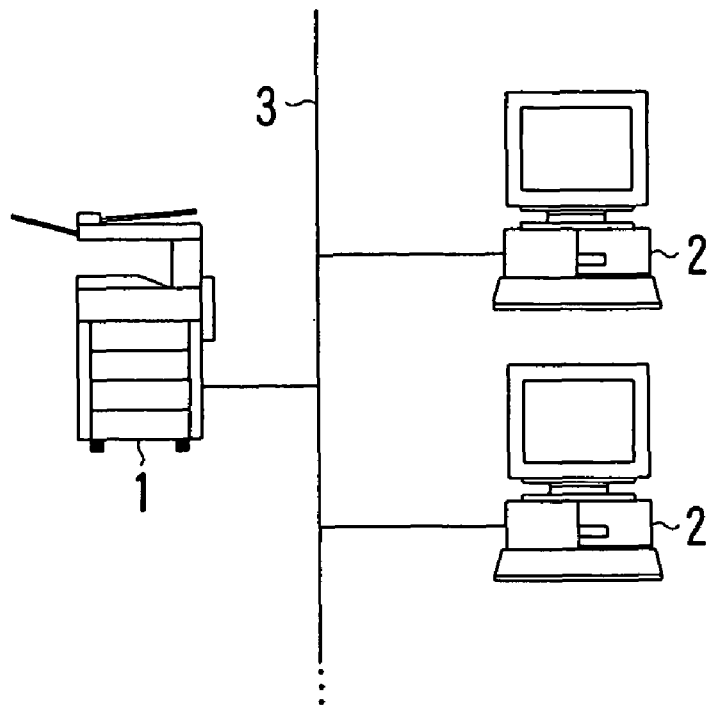
FIG. 1 shows an example of a network system that is provided with an image forming device according to the present invention.
Figure 2:
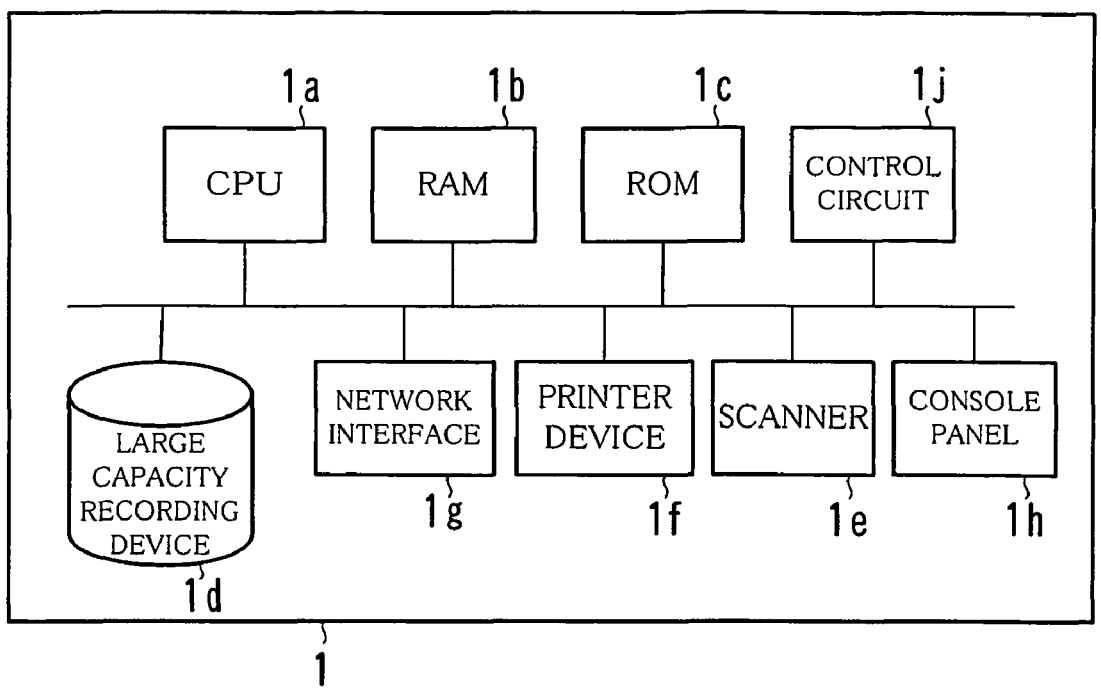
FIG. 2 shows an example of a hardware structure of the image forming device.
Figure 3:
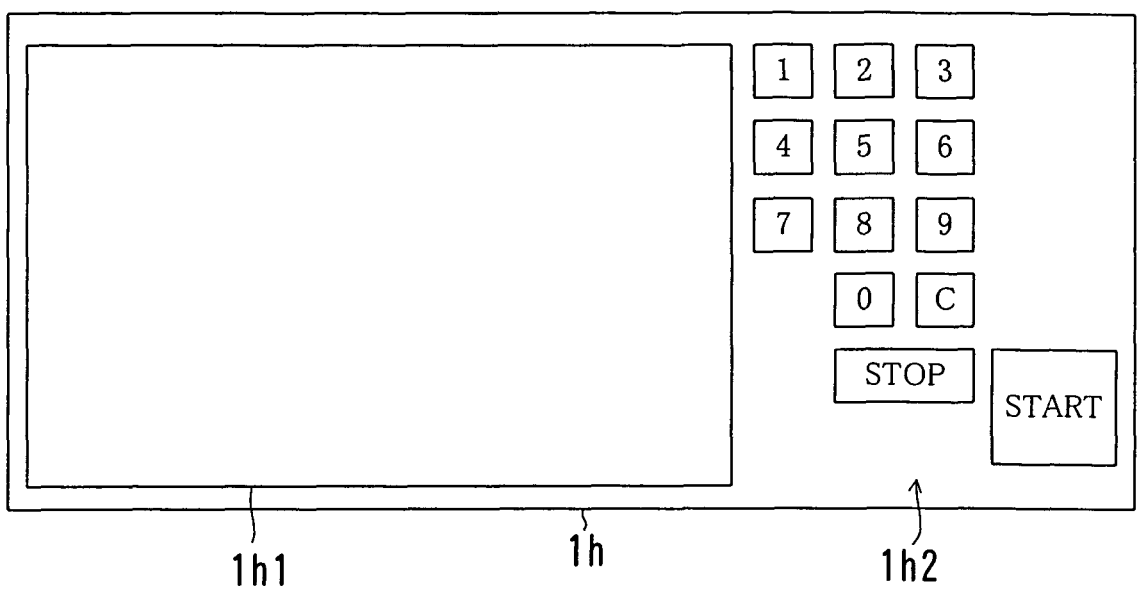
FIG. 3 shows an example of a console panel.
Figure 4:
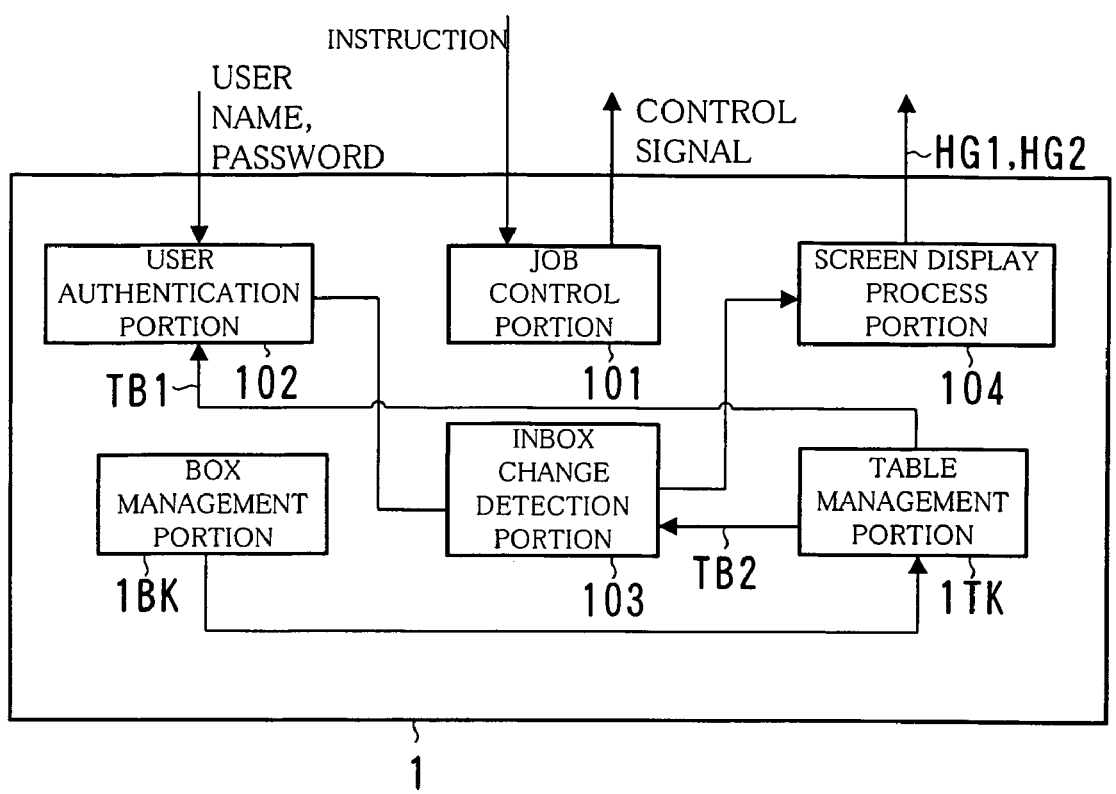
FIG. 4 shows an example of a functional structure of the image forming device according to a first embodiment.

FIG. 1 shows an example of a network system that is provided with an image forming device 1 according to the present invention, FIG. 2 shows an example of a hardware structure of the image forming device 1, FIG. 3 shows an example of a console panel 1h, FIG. 4 shows an example of a functional structure of the image forming device 1 according to a first embodiment.

The image forming device 1 according to the present invention is connected to terminal devices 2 via a communication line 3 as shown in FIG. 1. As the communication line 3, a LAN, the Internet, a public telephone line or a private line can be used.

The image forming device 1 is a device having integrated functions including a copier, a network printer, a scanner, a fax and a document server. It is called a multifunction device or an MFP (Multi Function Peripherals).

The document server provides a function in which a storage area called a "box" or a "personal box" is assigned to each user or a user group so that each user can store and manage files of image data or document data in his or her storage area (hereinafter referred to as a "box") or in a box of the group to which the user belongs. It is also called a "box function". The box corresponds to a "folder" or a "directory" in a personal computer. Note that contents included in one file are dealt as one document in this embodiment.

In addition, when performing a job using an application function, there is a box for temporarily storing a file in relationship with the job to be performed. The box having this role may be called a "function box" in particular. For example, there is a function box for temporarily storing a file to be the object of the job using a confidential print function (that is a function for network printing in which the image forming device 1 does not perform printing promptly when receiving print data from the terminal device 2 and retains the printing process until the user enters a preset password by correctly operating the console panel of the image forming device 1 when the printing process is started), or a function box for temporarily storing a file to be sent to a predetermined address. The file stored in the former is used for printing process when a correct password is entered in the console panel. The file stored in the latter is sent to the predetermined address when a transmission program is activated at a predetermined timing.

Furthermore, the image forming device 1 can be provided with various additional functions such as a booklet finish function, a broadcasting transmission function or a file transmission function by SMB (Server Message Block) protocol by adding new hardware or by installing new software.

As shown in FIG. 2, the image forming device 1 includes a CPU 1a, a RAM 1b, a ROM 1c, a large capacity recording device 1d such as a hard disk drive or an EEPROM, a scanner 1e, a printer device 1f, a network interface 1g, the console panel 1h, and a control circuit 1j.

The scanner 1e is a device that reads optically images such as photographs, characters, pictures or charts on a sheet of original paper (hereinafter may be simply referred to as an "original") so as to generate image data. The printer device 1f is a device for printing an image read by the scanner 1e or an image of image data received from the terminal device 2 or the like on a sheet of paper.

The console panel 1h includes a display portion 1h1 and an operating button unit 1h2 including a plurality of operating buttons as shown in FIG. 3.

The operating button unit 1h2 includes a plurality of keys for entering numbers, characters or symbols, a sensor for recognizing a pressed key, and a transmission circuit for sending a signal indicating the pressed key to the CPU 1a.

The display portion 1h1 displays a screen for giving a message or an instruction to a user who operates this image forming device 1, a screen for the user to enter setting contents and process contents and a screen that indicates an image formed in the image forming device 1 and a result of the process. In this embodiment, a touch panel is used as the display portion 1h1. Therefore, the display portion 1h1 has a function of detecting a position on the touch panel where a user touched with his or her finger and sending a signal indicating a result of the detection to the CPU 1a.

In this way, the console panel 1h plays a role as a user interface for a user who operates the image forming device 1 directly. Note that an application program and a driver for giving an instruction to the image forming device 1 are installed in the terminal device 2. Therefore, the user can operate the image forming device 1 by using the terminal device 2 from a remote place. As the terminal device 2, a personal computer, a workstation or a PDA (Personal Digital Assistant) can be used.

The network interface 1g shown in FIG. 2 is a device for communicating the terminal device 2. As the network interface 1g, an NIC (Network Interface Card), a modem or a TA (Terminal Adapter) can be used.

The control circuit 1j is a circuit for controlling devices that include the large capacity recording device 1d, the scanner 1e, the printer device 1f, the network interface 1g and the console panel 1h.

The large capacity recording device 1d stores a program and data for realizing functions including a job control portion 101, a user authentication portion 102, an inbox change detection portion 103, a screen display process portion 104, a box management portion 1BK and a table management portion 1TK as shown in FIG. 4. The program and data are loaded onto the RAM 1b if necessary, and the program is executed by the CPU 1a. A part or the entire of the program and the data may be stored in the ROM 1c. Furthermore, a part or the entire of the functions shown in FIG. 4 may be realized by the control circuit 1j.

Figure 5:
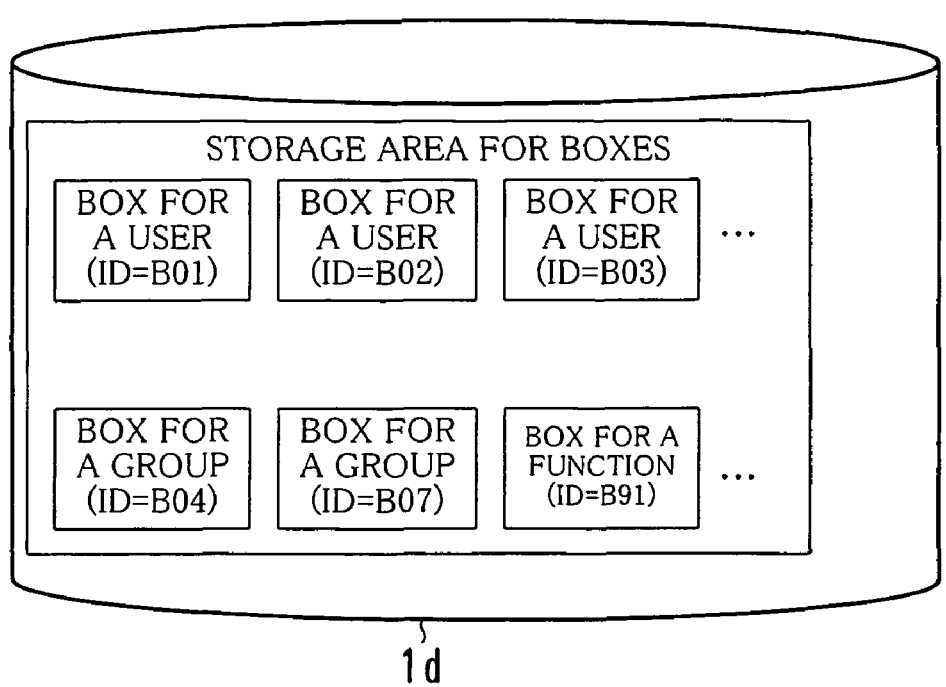
FIG. 5 shows an example of assignment of boxes in a large capacity recording device.
Figure 11:
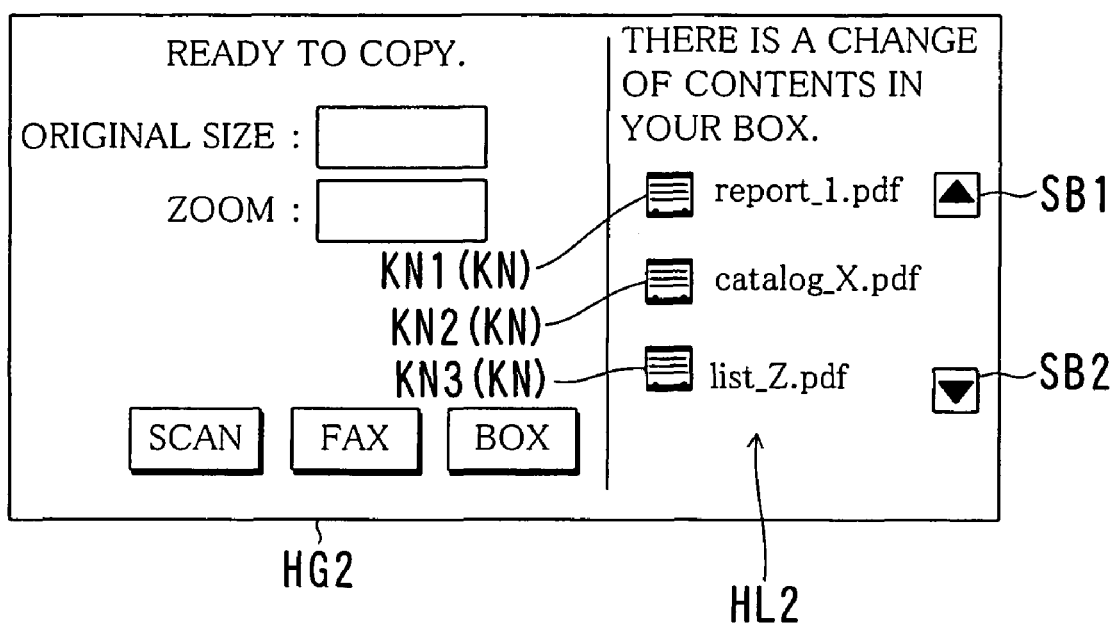
FIG. 11 shows an example of a copy job reception screen.
Figure 13A:
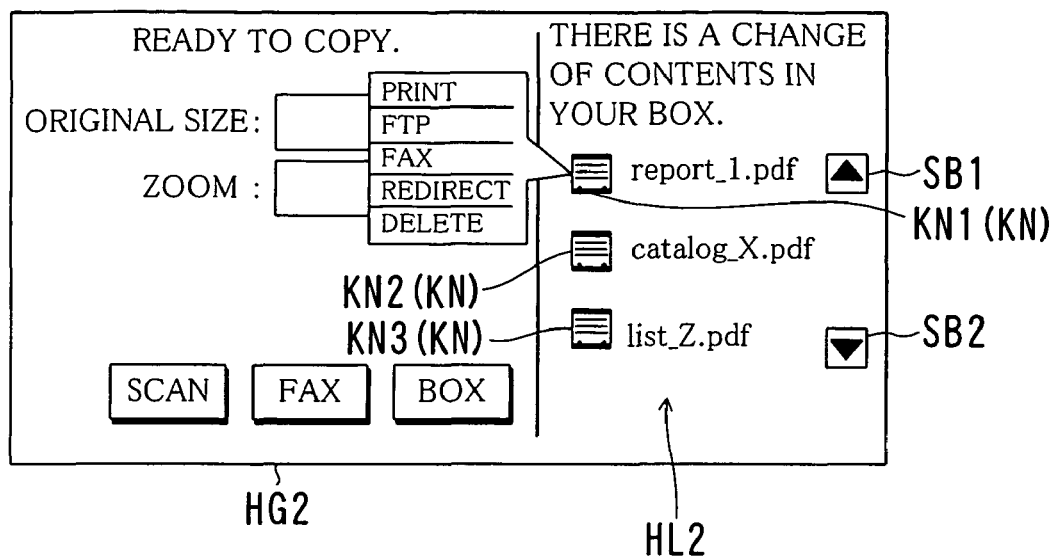
FIGS. 13(a) and 13(b) show examples of the copy job reception screen when an icon is pressed.
Figure 13B:
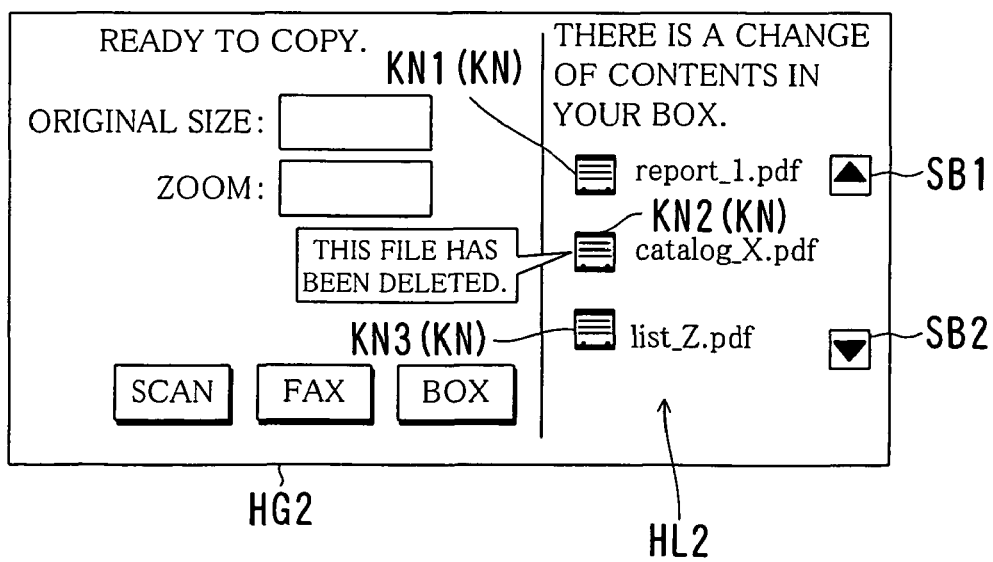

FIG. 5 shows an example of assignment of boxes in a large capacity recording device 1d, FIG. 6 shows an example of a user management table TB1, FIG. 7 shows an example of a box management table TB2, FIG. 8 shows an example of file management information 7F1, FIG. 9 shows an example of an additional function table TB3, FIG. 10 shows an example of a log-in screen HG1, FIG. 11 shows an example of a copy job reception screen HG2, FIG. 12 is a flowchart showing an example of a flow of a notification target determination process, and FIGS. 13(a) and 13(b) show examples of the copy job reception screen HG2 when an icon KN is pressed.

Contents of process in each portion shown in FIG. 4 will be described in detail as follows.

The box management portion 1BK shown in FIG. 4 performs management of boxes provided to the large capacity recording device 1d for storing files for each user, each group and each application function as shown in FIG. 5. For example, responding to a user's instruction, a process is performed for setting a box, erasing an existing box, updating or erasing a file in a box, or adding a new file in a box. Each box that is managed by the box management portion 1BK has a unique box ID.

The table management portion 1TK stores and manages tables including the user management table TB1, the box management table TB2 and the additional function table TB3. The user management table TB1 stores information about users who use the image forming device 1 as shown in FIG. 6. One record corresponds to one user. A "user name" is a user account name for a user to log in the image forming device 1. Namely, the user name has a role as ID information for identifying the user, so it must be unique. A "password" is a code that is used for user authentication when a user logs in.

A "latest log-in date" is the latest date (day and time) when the user logged in the image forming device 1. A value of the latest log-in date is updated at a predetermined timing to the present date every time when the user logs in the image forming device 1. Therefore, it can be said that the latest log-in date indicates the date when the user logged in the last time. An "operating history" indicates history of operating contents the user has done during the period from log-in to log-out in the last time. The "owned box ID" indicates box IDs of boxes owned by the user (including a box shared with other user).

The box management table TB2 stores information about each box managed by the table management portion 1TK as shown in FIG. 7. One record corresponds to one box. The "box ID" is ID information for identifying the box. A "box name" is a name of the box. The box name can be named by the user who is the owner of the box freely, but it is desirable to name so that the meaning of the box becomes clear and it can be distinguished from other box easily. An "owner" is a user or a group who owns the box.

In a field of the "file management information", file management information 7F (7F1, 7F2, . . . ) is stored. The file management information 7F includes an ID information of each file in the box or history information of the process. In the following description, such information is referred to as "file-by-file basis detailed information DTJ". For example, file-by-file basis detailed information DTJ of four files is included in the file management information 7F1 of a box having the box ID of "B01" as shown in FIG. 8.

A "BOX Document ID" of the file-by-file basis detailed information DTJ is ID information for distinguishing document of the file. Namely, it is also information for distinguishing a file. A "Document Name" is a name of the document of the file. Namely, it is also a file name.

A "- Time" indicates a date when a certain event occurred about the file. For example, a "Create Time" indicates a date when the file is generated in the box. An "Edit Time" indicates a date when contents of the file were updated. A "Delete Time" indicates a date when the file is deleted from the box.

Note that generation of a file in a box is not limited to the case where a newly obtained data such as scanned data of an image of an original are made a file but there is a case where data in a box are duplicated or moved. In addition, deletion of a file from a box is not limited to the case where the file is completely erased from the hard disk drive but there is a case where it is moved to other box. Namely, the "Create Time" and the "Delete Time" may indicate date when the file was duplicated or moved.

A "Check Flag" is a flag indicating whether the owner of the box has checked or not after an event occurred about the file. If the "Check Flag" is "1", it indicates that the owner has checked. If the "Check Flag" is "0", it indicates that the owner has not checked yet. Note that if the file is stored in a box shared by plural owners like a group box, one flags is prepared for each of the owners.

The additional function table TB3 stores information about functions that were added to the image forming device 1 and dates of additions as shown in FIG. 9.

The job control portion 101 shown in FIG. 4 controls each portion of the image forming device 1 so that a job can be executed in accordance with an instruction from the user. For example, it controls the scanner 1*e*, the printer device 1*f*, the large capacity recording device 1*d* or the network interface 1*g* so that a job such as a copy, a scan, a fax transmission or a print of an original can be executed.

In addition, the following event about a box can occur when such jobs are executed. For example, a new file may be generated and stored in a predetermined box. A file in another box or terminal device 2 may be moved to a predetermined box. Furthermore, an existing file in a box may be updated or deleted. If such an event occurred, the history thereof is written in the file management information 7F of the box (see FIGS. 7 and 8).

For example, it is supposed that an image file of the image was generated and stored in the box having the box ID of "B01" when the job of scanning an image of an original had been performed in accordance with an instruction of a user. In this case, an ID (a BOX Document ID) for distinguishing the image file from other files in the same box is issued, and a file name (Document Name) is determined. Then, the ID, the file name and the date when the image data were created (Create Time) are written as new file-by-file basis detailed information DTJ in the file management information 7F1. Note that the file name can be determined by the user freely or determined automatically by the image forming device 1 combining the present date or a user name.

In this case, together with this information, a flag (Check Flag) that indicates whether the owner of the box has checked that the present event (i.e., generation and storage of the image file) had occurred is also included in the file-by-file basis detailed information DTJ. However, an initial value of this flag is determined as follows. If the user who issued the instruction of the present job is the owner of the box of "B01", the user naturally knows about the present event. Therefore, an initial value of the flag is set to "1" that indicates that the check has done. If there are plural owners, only an initial value of the flag of the user who issued the instruction is set to "1", and initial values of flags of other owners are set to "0" that indicates that the check has not done. On the other hand, if the user who issued the instruction is not the owner of the box of "B01", all the owners do not know about the event, so initial values of all flags are set to "0".

Furthermore, it is supposed that an existing file in the box of "B01" is deleted in accordance with an instruction of the user. In this case, information of a date when the file is deleted (Delete Time) is added to the file-by-file basis detailed information DTJ of the file included in the file management information 7F1. In addition, in accordance with the user who issued the instruction, a value of the flag (Check Flag) is updated. Namely, according to the same reason in the above-mentioned case of generation of the file, the flag is updated to "1" if the user who issued the instruction is the owner of the box. However, if there are plural owners, only a flag of the user who issued the instruction is updated to "1", and flags of other owners are set to "0". If the user who issued the instruction is not the owner of the box, all flags are updated to "0". In the same way for the case where an existing file is updated, information of a date when the file is updated (Edit Time) is added, and a value of the flag is updated.

The user authentication portion 102 shown in FIG. 4 performs an authentication about whether the person who has intention of using the image forming device 1 is a regular user or not. This authentication is performed in the following procedure. If nobody is operating the image forming device 1 directly, the log-in screen HG1 shown in FIG. 10 is displayed on the display portion 1*h*1. A user who wants to use the image forming device 1 operates the operating button unit 1*h*2 so as to enter his or her user name and password. Then, the job control portion 101 receives the user name and the password, and sends an instruction to the user authentication portion 102 so as to perform a process of the user authentication.

The user authentication portion 102 extracts a record having a user name of the same value as the entered user name from the user management table TB1 shown in FIG. 6. Then, if the entered password is identical to the password of the record as a result of verification between them, it is determined that the user is a regular user. If they are not identical to one another, it is determined that the user is an unauthorized user. If there is no record having the user name of the same value as the entered user name in the user management table TB1, it is also determined that the user is an unauthorized user. The person who was determined to be an unauthorized user cannot use the image forming device 1.

If an authentication of a regular user is obtained, the user is permitted to use the image forming device 1. Namely, the user becomes the state of having logged in the image forming device 1. Then, the screen display process portion 104 displays the copy job reception screen HG2 shown in FIG. 11 on the display portion 1h1. The user can make the image forming device 1 perform a desired process by a predetermined operation for giving an instruction. Then, the job control portion 101 generates a job in accordance with the operation by the user and controls each portion of the image forming device 1.

For example, in order to copy an original, the original is set to a predetermined position of the scanner 1e. Then, the number of copies and a magnification are entered, and a "start" button on the operating button unit 1h2 (see FIG. 3) is pressed. Then, the job control portion 101 generates a copy job, registers it in a queue, and controls the scanner 1e and the printer device 1f so that the copy job is executed when its turn comes.

The user can press a "SCAN" button, a "FAX" button or a "BOX" button so as to switch the screen and perform a predetermined operation while viewing each screen in order to do scanning of an original, sending or receiving of fax, or using of a file in a box.

A change file list HL2, which indicates a file change in the box owned by the user during a period from the last log-in to the present log-in of the user, is displayed in the right area of the copy job reception screen HG2. The file change is detected by the inbox change detection portion 103 by the procedure as shown in FIG. 12.

Namely, the inbox change detection portion 103 searches a box owned by the user who logged in, i.e., a box indicated in the "owned box ID" from the user management table TB1 shown in FIG. 6 (#101 in FIG. 12) and searches a date of log-in of the last time, i.e., a date indicated in the "latest log-in date" (#102).

A file about which an event has happened from the date of the last log-in and about which the user has not checked that the event has happened is searched from the file management information 7F of the searched box (#103, #104). Namely, a file about with at least one of the "Create Time", the "Edit Time" and the "Delete Time" indicates a date and time after the date of log-in of the last time and about which the "Check Flag" indicates "0" is searched. If the user owns plural boxes, the process of Steps #103 and #104 is performed for each of the boxes (Yes in #105). In this way, a file that is included in the change file list HL2 is detected.

The screen display process portion 104 displays a change file list HL2 that indicates a file name of the file detected by the inbox change detection portion 103 on the right side of the copy job reception screen HG2. As the file name, a name that is indicated in the "Document Name" of the file-by-file basis detailed information DTJ (see FIG. 8) of the file is used. In addition, an icon KN is positioned at the left side of the file name. This icon KN is used as a short cut for retrieving a file of the file name. Namely, the user can retrieve a file and use the same by operating the icon KN.

For example, an icon KN1 is pressed in order to use a file having a file name of "report_1.pdf". Then, as shown in FIG. 13(a), a shortcut menu for instructing what process should be performed for the file is displayed at a vicinity of the icon KN1. The user presses and selects a name of his or her desired process from the shortcut menu. Then, the job control portion 101 generates a job executing the process for the file and registers the same in a queue. Then, when its turn comes, the job is executed.

If "print" is pressed, a job for printing the document of the file is generated and registered in the queue. On this occasion, the user is requested to set a print condition (such as a size of a sheet of paper, a magnification or application copy) if necessary. Then, the job's turn comes, the file is loaded onto the RAM 1b (see FIG. 2), and the printer device 1f is controlled in accordance with the print condition set by the user to perform the printing process.

If an "FTP transmission" is pressed, a job for sending the file to the terminal device 2 by the FTP (File Transfer Protocol) is generated and is registered in the queue. If a "FAX transmission" is pressed, a job for sending an image of a document of the file to a fax terminal is generated and is registered in the queue. If a "transfer" is pressed, a job for transferring the file to the terminal device 2 is generated and is registered in the queue. When these menus are pressed, the user is requested to designate a transmission destination or a transfer destination. Each of these jobs is also performed when its turn comes in the same manner as the case of "print". If a "deletion" is pressed, the file is deleted from the box.

If an icon KN of a file that is already deleted from the box is pressed, the file cannot be used any more. Therefore, as shown in FIG. 13(b), a message for informing about the deletion of the file from the box is displayed at a vicinity of the icon KN.

If there are many files that were detected by the inbox change detection portion 103, it may be difficult to display these file names and icons KN in one screen. In this case, the user presses scroll buttons SB1 and SB2 so that the change file list HL2 is scrolled and all files can be checked.

In this way, the flag of the file having a file name that is displayed by the change file list HL2 is updated to "1" that indicates that the check has done. However, if there are plural flags, only the flag of the user who logged in is updated.

It is possible that the flag is not updated just when the file name is displayed, but it is updated when the user did a predetermined operation (for example, use of the file or a predetermined operation for informing the image forming device 1 of having done the check).

Note that it is possible to display a name of a box in which the file is stored or a box in which the file was stored together with the file name in the change file list HL2. It is also possible to display ID information (the "BOX Document ID" shown in FIG. 8) or the box ID of a document of the file. It is also possible to use different designs of icons KN of files in accordance with types of the event. For example, an icon KN of a file of a newly created box has blue color, an icon KN of an edited file has yellow color, and an icon KN of a file of a deleted file has red color. Alternatively, a shape of the icon KN may be changed.

Figure 14:
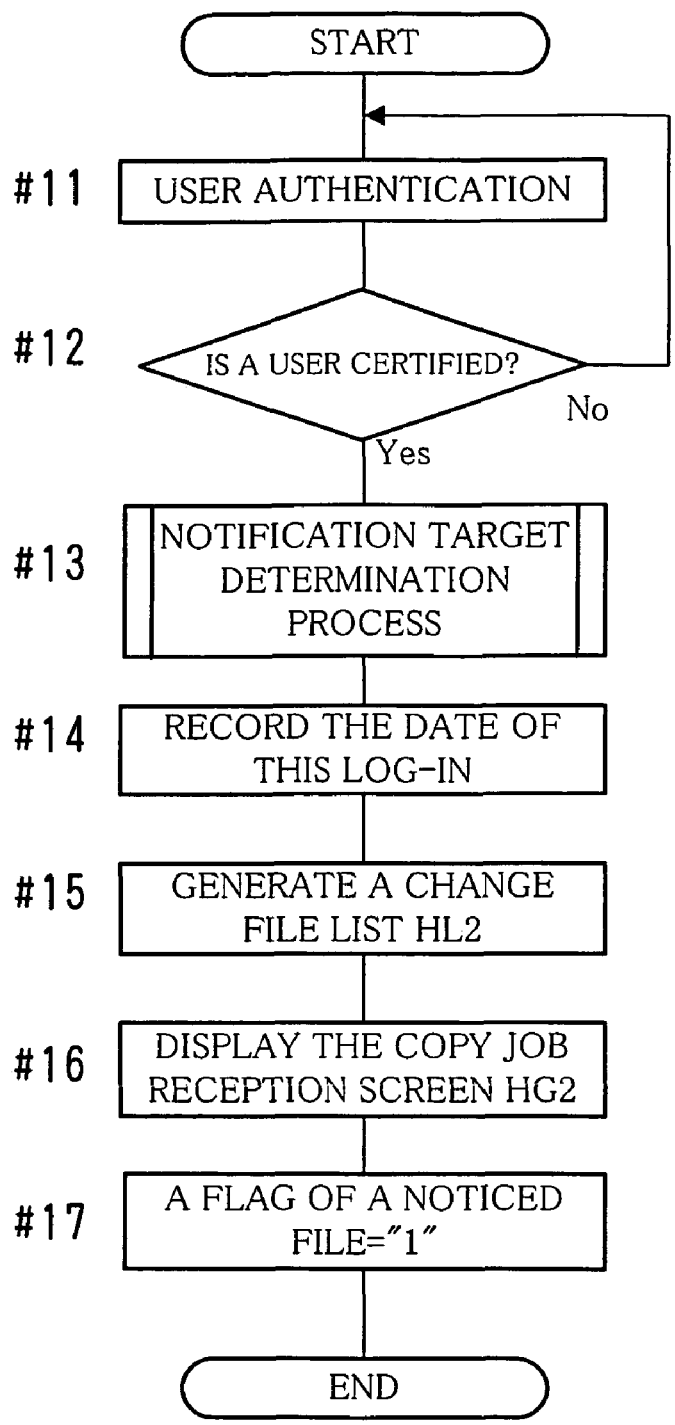
FIG. 14 is a flowchart showing an example of a flow of a general process in the image forming device according to the first embodiment.

FIG. 14 is a flowchart showing an example of a flow of a general process in the image forming device 1 according to the first embodiment. Next, a flow of a process in the image forming device 1 from the user's log-in to a display of the copy job reception screen HG2 shown in FIG. 11 will be described with reference to the flowchart shown in FIG. 14.

The user enters his or her user name and password in the log-in screen HG1 (see FIG. 10) so as to try to log in the image forming device 1. Then, the image forming device 1 verifies the entered user name and password with user names and passwords stored in the user management table TB1 (see FIG. 6), so as to perform authentication about whether the user is a regular user or not (#11 in FIG. 14).

If authentication that the user is a regular user is obtained (Yes in #12), a file is detected promptly in which a change happened by other user's operation after the user's log-in of the last time among files that are stored or files that were stored in the box owned by the user (#13). A method of this detecting process is already described with reference to FIG. 12.

The date of log-in this time is recorded in the user management table TB1 shown in FIG. 6 by being overwritten on the user's record of the "latest log-in date" (#14), and a list of files detected in Step #13, which is the change file list HL2, is generated (#15). Then, as shown in FIG. 11, the copy job reception screen HG2 including the change file list HL2 is displayed (#16). Thus, a notice of a file change that happened after the user checked the file that last time is sent.

When the user checked the noticed files, flags of the files (Check Flags shown in FIG. 8) are updated to "1" (#17). In addition, the user can make the image forming device 1 execute a job such as a print of a document or a file transmission only by pressing the icon KN and a type of job on the copy job reception screen HG2 (see FIG. 13(*a*)).

According to this embodiment, a list of files in which a change happened during the period from the date of the previous log-in to the date of the present log-in due to other user's operation in the box owned by the user is displayed on the display portion 1*h*1 promptly when the user logs in the image forming device 1. Thus, the user can check a state of the file change in the box swiftly and appropriately. Furthermore, the user can access the file readily only by pressing a button located at the next to the file name.

Figure 15:
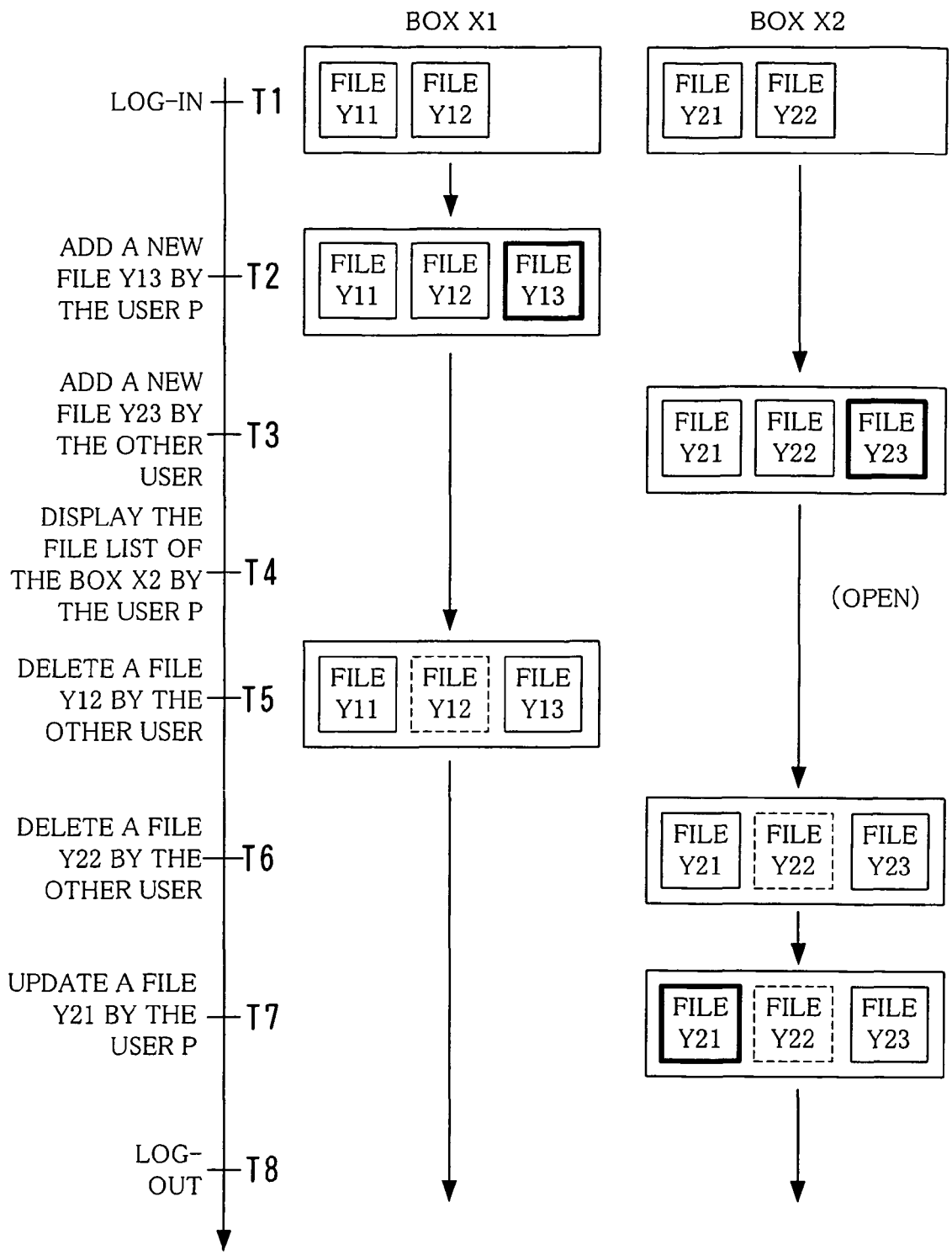
FIG. 15 shows an example of events that have happened during the period from log-in to log-out of the user for the image forming device.

FIG. 15 shows an example of events that have happened during the period from log-in to log-out of the user for the image forming device 1.

Although files in which a change has happened during the period from the date of the previous log-in to the date of the present log-in are objects of notification for the user in this embodiment, other files in which a change has happened during other period may be also objects of the notification. For example, it is possible that the files in which a change has happened before the previous log-in are the objects, and among them a file having the flag of "0" (namely, a file in which a change was not checked at the previous log-in) may be detected and included in the change file list HL2.

Instead of using a flag, it is possible to use a history, which indicates which screen is displayed in the image forming device 1 for the user the last time or which process was performed, for generating the change file list HL2. In this case, files to be included in the change file list HL2 are detected in accordance with the following rules (a)-(c).

(a) If a box is opened for displaying a file list screen, files are detected in which a change has happened after the date of the display concerning files that are stored or files that were stored in the box.

(b) Concerning files that are stored or files that were stored in a box that is not opened, files in which a change has happened after the date of the previous log-in are detected.

(c) Regardless of the rules (a) and (b), a file in which a change happened due to an operation of the user who logged in (a new file that is stored in the box, an updated file or a file that is deleted from the box) is excepted from the object of the detection.

For example, it is supposed that event happened as shown in FIG. 15 during the period from log-in to log-out of the last time by the user P concerning the boxes X1 and X2 owned by the user. The information about the events of the file (history information about types of the events, objects of processes of the event, users who made the instructions to perform the events and dates when the process were performed) is recorded as file management information 7F (see FIGS. 7 and 8), information about displays of the screens (history information about displayed screens, users who made instructions to display and dates when displays were performed) is recorded as display history information in the table management portion 1TK. The contents shown in FIG. 15 will be described briefly below.

At the time T1 when the user logged in, it is supposed that the box X1 stored the files Y11 and Y12 while the box X2 stored the files Y21 and Y22. Furthermore, it is supposed that just after the time T1, the user P saw the change file list HL2 of the copy job reception screen HG2 (see FIG. 11) and checked the change that had happened in the files stored in the boxes X1 and X2 before the log-in.

At time T2, an operation of the user P caused an addition of a new file Y13 in the box X1. At time T3, other user's operation caused an addition of a new file Y23 in the box X2. At time T4, the user P opened the box X2 and displayed a file list screen so as to check what types of files are stored in the box X2. In this case, the user P can check that a new file Y23 added by the other user exists.

Other user's operation caused deletion of a file Y12 from the box X1 at time T5 and deletion of a file Y22 from the box X2 at time T6. At time T7, an operation of the user P caused an update of the file Y21. Then, at time T8 the user P logged out of the image forming device 1. Note that files shown by a dotted line in FIG. 15 indicates that they have been deleted.

If such events happened during the period from log-in (time T1) to log-out (time T8) of the last time, and when the user P logs in the image forming device 1 again after time T8, the inbox change detection portion 103 detects a file to be included in the change file list HL2 in accordance with the above-mentioned rules (a)-(c) as below.

Concerning the box X1, the file list screen have not displayed yet, a file in which a change is generated by an operation of users except for the user P, i.e., the file Y12 is detected in accordance with the rules (b) and (c). On the other hand, concerning the box X2, the file list screen is displayed at the time T4, so a file in which a change happened due to an operation of user except the user P after the time T4, i.e., the file Y22 is detected in accordance with the rules (a) and (c).

Second Embodiment

Figure 16:
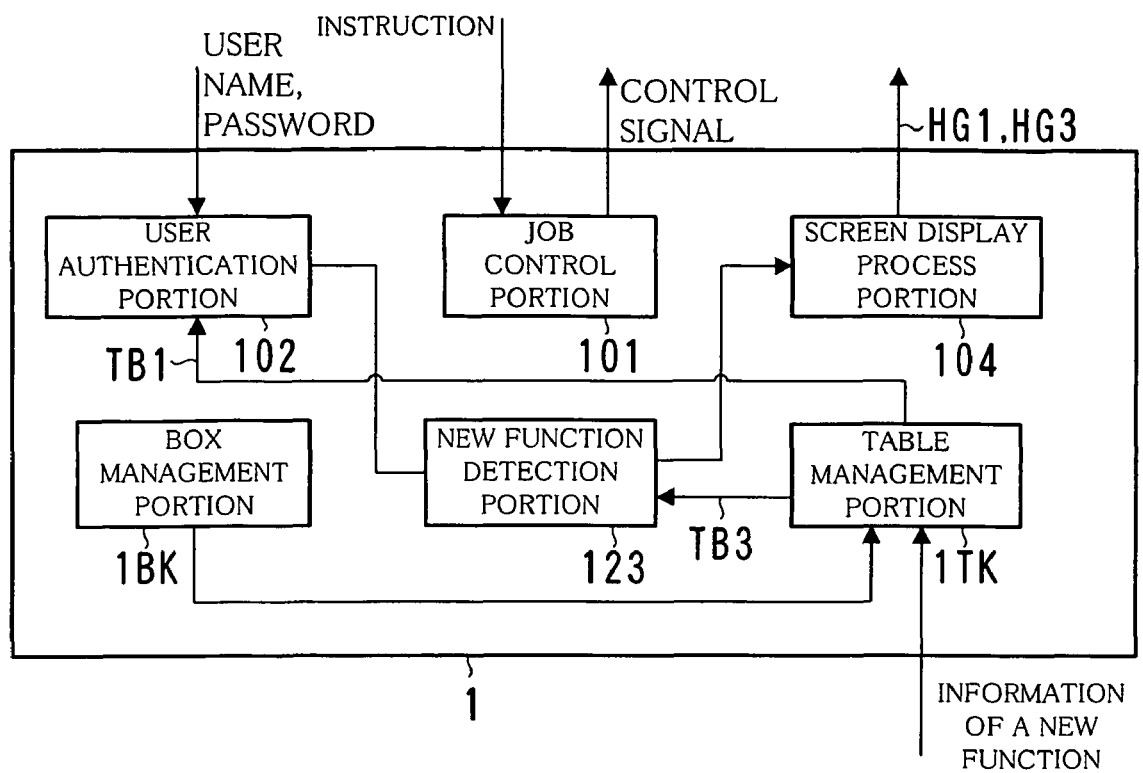
FIG. 16 shows an example of a functional structure of the image forming device according to a second embodiment.
Figure 17:
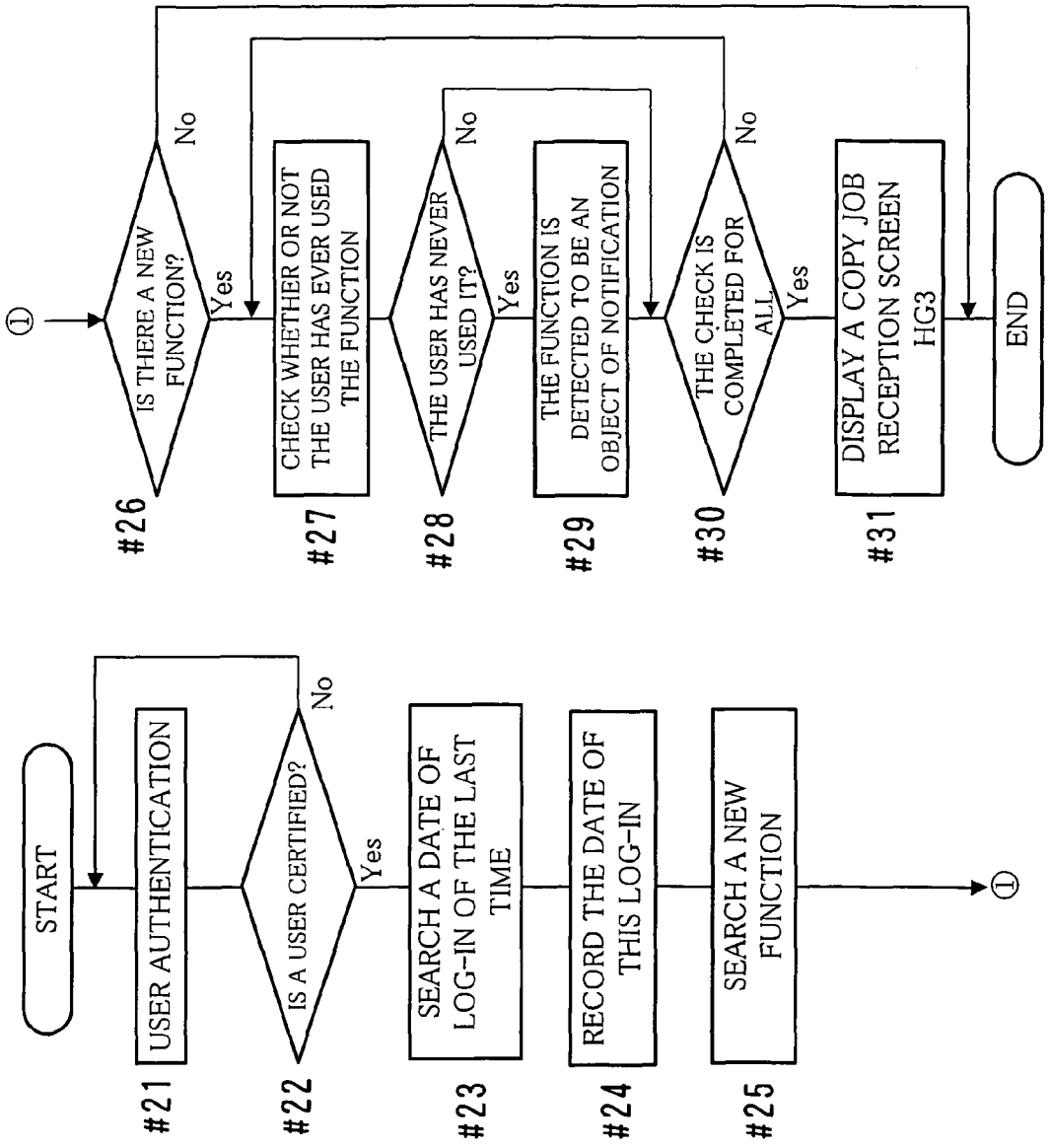
FIG. 17 is a flowchart showing an example of a flow of a general process in the image forming device according to the second embodiment.
Figure 18:
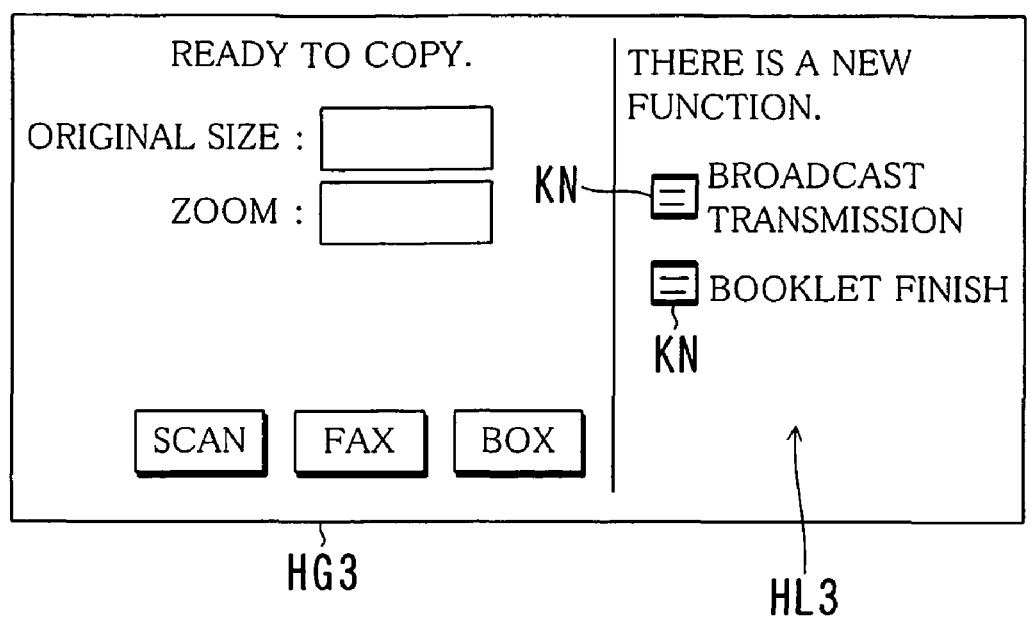
FIG. 18 shows an example of a copy job reception screen.

FIG. 16 shows an example of a functional structure of the image forming device 1 according to a second embodiment, FIG. 17 is a flowchart showing an example of a flow of a general process in the image forming device 1 according to the second embodiment, and FIG. 18 shows an example of a copy job reception screen HG3.

In the first embodiment, among files that are stored and files that were stored in the box owned by the user, files in which a change happened due to other user's operation after the user checked the contents the last time are objects of notification to the user. In the second embodiment, functions that were added to the image forming device 1 after the user used the image forming device 1 the last time are detected to be objects of notification.

A structure of the image forming device 1 in the second embodiment is basically the same as that in the first embodiment. However, as shown in FIG. 16, a new function detection portion 123 is provided instead of the inbox change detection portion 103 (FIG. 4). Contents of a process of each portion of the image forming device 1 will be described with reference to a flowchart shown in FIG. 17. Particularly, contents of a process of the new function detection portion 123 and difference between the first and the second embodiments will be described. Description of contents of a process that is the same as the first embodiment will be omitted.

A user who wants to use the image forming device 1 enters his or her user name and password while viewing the log-in screen HG1 shown in FIG. 10. Then, the user authentication portion 102 performs the user authentication process (#21 in FIG. 17). If it is authenticated that the user is a regular user (Yes in #22), the date when the user logged in the last time is searched from the user management table TB1 shown in FIG. 6 (#23). The date when the user logs in this time is recorded by being written over the date when the user logged in the last time (namely, the "latest log-in date" of the user shown in FIG. 6) (#24).

Functions that were added to the image forming device 1 after the date of search in Step #23 are searched from the additional function table TB3 shown in FIG. 9 (#25).

If there is a function that was added (Yes in #26), it is checked whether or not the user has ever used the function by referring the "operating history" of the user in the user management table TB1 (#27). If the user has never used it (Yes in #28), the function is detected to be an object of notification to the user (#29). If the user has ever used it (No in #28), the function is excluded from the objects of notification to the user. If all the plural added functions are found in Step #25, the process of Steps #27-#29 is executed for each of the functions.

When the check is completed for all the added functions that were found (Yes in #30), a new function list HL3 that is a list of the functions detected in Step #29 is generated, and a copy job reception screen HG3 as shown in FIG. 18 is displayed (#31).

The user can make the image forming device 1 perform the job using the function by pressing the icon KN on the left side of the added function. For example, if the icon KN on the left side of the "broadcasting transmission" is pressed, a screen is displayed for selecting a file to be sent, plural destinations and a method of transmission. The user can give the instruction of the job for broadcasting transmission to the image forming device 1 only by selecting the items while viewing the screen.

According to the second embodiment, when the user logs in the image forming device 1, among new functions added during the period from the date of the previous log-in to the date of the present log-in, only functions that the user has never used can be objects of notification to the user.

Although information about function added to the image forming device 1 is managed by the additional function table TB3, and addition of functions is detected in accordance with the additional function table TB3 in the second embodiment, other method may be used. For example, in general, when an application function is added, a new function box necessary for realizing the new application function is usually created. Therefore, a new function may be detected by comparing the date when the function box is created and the date when the user logged in the last time.

Although the case where the user operates the console panel 1h of the image forming device 1 so as to use the image forming device 1 is exemplified in the first and the second embodiments, the present invention can also be applied to a case where the terminal device 2 is used for controlling the image forming device 1 from a remote place. In this case, the image forming device 1 displays the log-in screen HG1 shown in FIG. 10, the copy job reception screen HG2 shown in FIG. 11 and a screen corresponding to the copy job reception screen HG3 shown in FIG. 18 on the terminal device 2, and the process of each portion is performed in accordance with the instruction or the like received from the terminal device 2.

It is possible that when the user logs in, a screen is displayed in which both the change file list HL2 (see FIG. 11) and the new function list HL3 (FIG. 18) are located. It is also possible to structure so that the displays of the change file list HL2 and the new function list HL3 are switched by a simple operation (for example, by pressing a predetermined button).

Furthermore, the structure of the entire or a part of the image forming device 1, the contents of processes, the orders of processes, and the structure of the database can be modified in accordance with the spirit of the present invention.

The present invention can be used eligibly particularly for an image forming device having a box function that is used by many people.

While the presently preferred embodiments of the present invention have been shown and described, it will be understood that the present invention is not limited thereto, and that various changes and modifications may be made by those skilled in the art without departing from the scope of the invention as set forth in the appended claims.

According to the present invention, management of a box shared by plural users can be performed by a user more securely at more appropriate timing than the conventional method. According to another aspect of the present invention, addition of an application function can be notified to a user appropriately.

What is claimed is:

1. A storage portion management device of an image forming device for managing a storage portion of the image forming device having a storage area assigned to each user for storing a file, comprising:
    a change history information recording portion for recording a file change in the storage area together with a time when the change happened as a change history information; and
    a change notifying portion for notifying the user when the user logs in about the change that happened in the storage area of the user before the user logs in this time in accordance with the change history information of the storage area.

2. An image forming device including a storage area assigned to each user for storing a file, comprising:
    a change history information recording portion for recording a file change in the storage area together with a time when the change happened as a change history information; and
    a change notifying portion for notifying the user when the user logs in the image forming device about the change that happened in the storage area of the user before the user logs in this time in accordance with the change history information of the storage area.

3. The image forming device according to claim 2, wherein the change history information recording portion records the change as well as the change history information that indicates whose instruction has caused the change, and the change notifying portion detects for the notification the change generated by other user's instruction after the previous log-in of the user among changes generated in the storage area of the user.

4. The image forming device according to claim 2, further comprising a display history information recording portion for recording a display history information that indicates the storage area of a list display of the stored files, a user who made the instruction to display the list and a time when the list was displayed, wherein the change history information recording portion records the change as well as the change history information that indicates whose instruction has caused the change, and the change notifying portion notifies the user of a change that happened due to other user's instruction after the user displayed a list of files stored in the storage area of the user the last time among the changes that happened in the storage area of the user.

5. The image forming device according to claim 2, further comprising an image processing portion for executing a process concerning input or output of an image, wherein the change notifying portion notifies the user of the change by displaying a screen including buttons corresponding to each file in which the change happened, and the image processing portion performs a process concerning input or output of an image by using the file corresponding to the button selected by the user.

6. The image forming device according to claim 2, forming device further comprising at least an image reader portion for scanning an original so as to produce image data and a printer portion for printing out the image data.

7. The image forming device according to claim 4, wherein the change is one of storage of a new file in the storage area, update of a stored file and deletion of a stored file, and the change notifying portion notifies the user that a new file is stored in the storage area by the other user or that the other user updated or deleted a file stored in the storage area.

8. An image forming device for performing a process concerning input or output of an image, comprising:
  a function extension history information recording portion for recording a newly extended function in the image forming device together with a time of the extension as function extension history information; and
  a notifying portion for notifying the user when the user logs in the image forming device about the function.

9. The image forming device according to claim 8, wherein the notifying portion notifies about the function that was extended during the period from the previous log-in to the present log-in of the user in accordance with the function extension history information.

10. The image forming device according to claim 8, wherein the image forming device is an image forming device comprising at least an image reader portion for scanning an original so as to produce image data and a printer portion for printing out the image data.

11. The image forming device according to claim 8, further comprising an image processing portion for performing a process concerning input or output of an image, wherein the notifying portion notifies the user of the function by displaying a screen including a button corresponding to the function, and the image processing portion performs a process concerning input or output of an image by using the function corresponding to the button selected by the user.

12. A method for managing a storage area in an image forming device that is assigned to each user for storing a file, the method comprising:
  recording, by a processor provided in the image forming device, a file change in the storage area together with a time when the change happened as change history information, and
  notifying, by the processor, the user when the user logs in about the change that happened in the storage area of the user before the user logs in this time in accordance with the change history information of the storage area.

13. A method for controlling an image forming device in which a storage area is assigned to each user for storing a file, the method comprising:
  recording a file change in the storage area together with a time when the change happened as change history information; and
  notifying the user when the user logs in the image forming device about the change that happened in the storage area of the user before the user logs in this time in accordance with the change history information of the storage area.

14. The method according to claim 13, wherein the notification of the change is performed by displaying a screen including a button corresponding to each file in which the change happened, and the process concerning input or output of an image is performed by using the file corresponding to the button selected by the user.

15. A computer readable medium storing a program product for use in a computer that controls a storage device in which a storage area is assigned to each user for storing a file, the computer program product makes the computer execute the process comprising the steps of: recording a file change in the storage area together with a time when the change happened as change history information; and notifying the user when the user logs in about the change that happened in the storage area of the user before the user logs in this time in accordance with the change history information of the storage area.

16. The computer readable medium according to claim 15, wherein the notifying step is performed by displaying a screen including a button corresponding to each file in which the change happened, and the process concerning input or output of an image is performed by using the file corresponding to the button selected by the user.

17. A method for performing a process concerning input or output of an image in an image forming device, comprising:
  recording as function extension history information a newly extended function together with a time of extension in a function extension history information recording portion of an image forming device, and
  notifying, by a notifying portion, the user about the function when the user logs in the image forming device.

18. The method according to claim 17, wherein the notifying comprises notifying about the function that was extended during the period from the previous log-in to the present log-in of the user in accordance with the function extension history information.

19. The method according to claim 17, further comprising scanning an original by an image reader portion of the image forming device so as to produce image data, and printing out the image data by a printer portion of the image forming device.

20. The method according to claim 17, further comprising performing a process concerning input or output of an image by an image processing portion of the image forming device, wherein the notifying of the user of the function comprises displaying a screen including a button corresponding to the function, and wherein the performing a process concerning input or output of an image comprises using the function corresponding to the button selected by the user.

21. A computer readable medium storing a program product for use in a computer that controls an image forming device wherein the computer program product makes the computer execute the process comprising:
  recording as function extension history information a newly extended function together with a time of extension in a function extension history information recording portion of an image forming device, and
  notifying, by a notifying portion, the user about the function when the user logs in the image forming device.

22. The computer readable medium according to claim 21, wherein the notifying comprises notifying about the function that was extended during the period from the previous log-in to the present log-in of the user in accordance with the function extension history information.

23. The computer readable medium according to claim 21, wherein the process further comprises scanning an original by an image reader portion of the image forming device so as to produce image data, and printing out the image data by a printer portion of the image forming device.

24. The computer readable medium according to claim 21, wherein the process further comprises performing a process concerning input or output of an image by an image processing portion of the image forming device, wherein the notifying of the user of the function comprises displaying a screen including a button corresponding to the function, and wherein the performing a process concerning input or output of an image comprises using the function corresponding to the button selected by the user.

* * * * *